(12) United States Patent
Songatikamas et al.

(10) Patent No.: US 10,744,531 B2
(45) Date of Patent: Aug. 18, 2020

(54) MULTI-CORE, MULTI-DIMENSION ELECTROMAGNET

(71) Applicant: Apple Inc., Cupertino, CA (US)

(72) Inventors: Teera Songatikamas, San Jose, CA (US); Joseph C. Doll, Cupertino, CA (US); Matthew A. Bigarani, San Jose, CA (US)

(73) Assignee: Apple Inc., Cupertino, CA (US)

(*) Notice: Subject to any disclaimer, the term of this patent is extended or adjusted under 35 U.S.C. 154(b) by 89 days.

(21) Appl. No.: 15/693,321

(22) Filed: Aug. 31, 2017

(65) Prior Publication Data

US 2018/0085786 A1 Mar. 29, 2018

Related U.S. Application Data

(60) Provisional application No. 62/399,266, filed on Sep. 23, 2016.

(51) Int. Cl.
| | |
|---|---|
| *H01F 5/00* | (2006.01) |
| *B06B 1/04* | (2006.01) |
| *B06B 1/02* | (2006.01) |
| *H01F 7/16* | (2006.01) |
| *G06F 3/01* | (2006.01) |
| *G06F 3/0354* | (2013.01) |

(52) U.S. Cl.
CPC ............ *B06B 1/045* (2013.01); *B06B 1/0207* (2013.01); *G06F 3/016* (2013.01); *G06F 3/03547* (2013.01); *H01F 7/1638* (2013.01); *H01F 2007/1684* (2013.01); *H01F 2007/1692* (2013.01)

(58) Field of Classification Search
CPC .... H01F 7/1844; H01F 7/1638; G06F 1/1637; G06F 3/016; G06F 3/041; G06B 1/045; G06B 1/0207
USPC .......................................................... 335/266
See application file for complete search history.

(56) References Cited

U.S. PATENT DOCUMENTS

| | | | | |
|---|---|---|---|---|
| 4,871,992 A | * | 10/1989 | Petersen ............... | G09B 21/003 340/407.1 |
| 5,136,194 A | * | 8/1992 | Oudet .................... | H02K 33/06 310/15 |
| 5,172,092 A | * | 12/1992 | Nguyen ................ | H04M 19/04 340/384.73 |
| 5,539,608 A | * | 7/1996 | Hurley ............... | G01R 31/3278 361/152 |

(Continued)

*Primary Examiner* — Shawki S Ismail
*Assistant Examiner* — Lisa N Homza
(74) *Attorney, Agent, or Firm* — Fish & Richardson P.C.

(57) ABSTRACT

In an embodiment, an electromagnetic reluctance actuator comprises: a core assembly including a plurality of magnetic cores arranged in a two-dimensional plane, each core comprised of ferromagnetic material and wound by a coil of conductive wire, the coils operable for producing magnetic flux density in response to electrical currents flowing in the coils, wherein the current in each coil flows in a direction that is opposite the currents flowing in adjacent coils; and an actuator, at least a portion of which comprises ferritic material magnetically coupled to the coils by a magnetic circuit, for producing mechanical force in response to the effect of magnetic flux on the portion, the portion of the actuator being mounted for movement relative to the core assembly.

10 Claims, 4 Drawing Sheets

(56) References Cited

U.S. PATENT DOCUMENTS

| | | | | |
|---|---|---|---|---|
| 5,624,409 A * | 4/1997 | Seale | A61M 5/16809 | 604/246 |
| 5,717,423 A * | 2/1998 | Parker | G06F 3/016 | 345/108 |
| 6,337,678 B1 * | 1/2002 | Fish | G06F 3/011 | 345/156 |
| 6,339,678 B1 * | 1/2002 | Sorensen | A61L 2/07 | 269/139 |
| 6,734,785 B2 * | 5/2004 | Petersen | G09B 21/004 | 340/4.12 |
| 8,740,618 B2 * | 6/2014 | Shaw | G09B 21/004 | 116/17 |
| 9,949,390 B1 * | 4/2018 | Doll | G06F 3/016 | |
| 2001/0043450 A1 * | 11/2001 | Seale | F01L 9/04 | 361/160 |
| 2002/0175836 A1 * | 11/2002 | Roberts | G06F 3/0414 | 341/34 |
| 2005/0069842 A1 * | 3/2005 | Schleppenbach | G09B 21/004 | 434/113 |
| 2007/0090833 A1 * | 4/2007 | Hachtel | G01B 7/105 | 324/230 |
| 2008/0024963 A1 * | 1/2008 | Weksler | G06F 1/1616 | 361/679.01 |
| 2008/0246735 A1 * | 10/2008 | Reynolds | G06F 3/016 | 345/173 |
| 2008/0253081 A1 * | 10/2008 | Tracy | G06F 1/1616 | 361/679.5 |
| 2009/0007758 A1 * | 1/2009 | Schlosser | G06F 3/016 | 84/436 |
| 2011/0248916 A1 * | 10/2011 | Griffin | G06F 3/016 | 345/157 |
| 2013/0028390 A1 * | 1/2013 | Kalenyak | A61B 6/035 | 378/197 |
| 2014/0002249 A1 * | 1/2014 | Lim | G06F 3/016 | 340/407.1 |
| 2014/0197936 A1 * | 7/2014 | Biggs | G08B 6/00 | 340/407.1 |
| 2014/0307369 A1 * | 10/2014 | Lee | H04M 1/0216 | 361/679.01 |
| 2014/0354381 A1 * | 12/2014 | Kohlhafer | H01H 50/20 | 335/179 |
| 2015/0109223 A1 * | 4/2015 | Kessler | G06F 3/016 | 345/173 |
| 2017/0047835 A1 * | 2/2017 | Takahashi | A61B 5/022 | |
| 2017/0129759 A1 * | 5/2017 | Cocchi | B67C 3/202 | |
| 2018/0090253 A1 * | 3/2018 | Songatikamas | H01F 7/1844 | |
| 2018/0314331 A1 * | 11/2018 | Doll | G06F 3/016 | |

* cited by examiner

MULTI-CORE, MULTI-DIMENSION ELECTROMAGNET

CROSS-REFERENCE TO RELATED APPLICATION

This application claims priority to U.S. Provisional Application No. 62/399,266, filed Sep. 23, 2016, the entire contents of which are incorporated herein by reference.

TECHNICAL FIELD

This disclosure relates generally to electromagnets.

BACKGROUND

Electromagnets usually include a number of closely spaced turns of wire or coil that create a magnetic field. The wire turns are wound around a magnetic core made from a ferromagnetic material. The magnetic core concentrates the magnetic flux to make a powerful electromagnet. The magnetic field can be changed by controlling the amount of electric current in the coil. The electromagnet requires a continuous supply of current to maintain the magnetic field. When current flows in the coil magnetic flux density is generated in the core material which can be concentrated in a single direction. Depending on the design of the electromagnet, the magnetic flux density can provide an attractive force (pull force) on a ferromagnetic target. This "pull" force can be used in electromagnetic reluctance actuators.

An electromagnetic reluctance actuator operates on the principle that a magnetic material, when placed in a magnetic field, will experience a mechanical force tending to move the material in a direction parallel to the field to minimize the system energy. At any point on the surface of the material the reluctance force is proportional to the square of the magnetic flux density $B^2$ of the magnetic field experienced at that point, as shown in Equation [1]:

$$F_{rel} = f_{ma} \cdot A = \frac{B^2 A}{2\mu_o} = \frac{\Phi^2}{2\mu_o A}, \quad [1]$$

where $F_{rel}$ is reluctance force, $f_{ma}$ is surface force density, $A$ is the pole surface area, $B$ is the magnetic flux density, $\Phi$ is magnetic flux and $\mu_o$ is vacuum permeability.

A typical design objective for electromagnetic reluctance actuator is to optimize the electromagnet design to delay magnetic field saturation. Magnetic field saturation is a state reached when an increase in an applied external magnetic field cannot increase the magnetization of the core material further, resulting in the total magnetic flux density leveling off. This may result in a force that is too weak for a particular application.

SUMMARY

In an embodiment, an electromagnetic reluctance actuator comprises: a core assembly including a plurality of magnetic cores arranged in a two-dimensional plane, each core comprised of ferromagnetic material and wound by a coil of conductive wire, the coils operable for producing magnetic flux density in response to electrical currents flowing in the coils, wherein the current in each coil flows in a direction that is opposite the currents flowing in adjacent coils; and an actuator, at least a portion of which comprises ferritic material magnetically coupled to the coils by a magnetic circuit, for producing mechanical force in response to the effect of magnetic flux on the portion, the portion of the actuator being mounted for movement relative to the core assembly.

In an embodiment, a system comprises: a core assembly including a plurality of magnetic cores arranged in a two-dimensional plane, each core comprised of ferromagnetic material and wound by a coil of conductive wire, the coils operable for producing magnetic flux density in response to electrical currents flowing in the coils, wherein the current in each coil flows in a direction that is opposite the currents flowing in adjacent coils; an actuator, at least a portion of which comprises ferritic material magnetically coupled to the coils by a magnetic circuit, for producing mechanical force in response to the effect of magnetic flux on the portion, the portion of the actuator being mounted for movement relative to the core assembly; power electronics operable to supply currents or voltages to the coils; and sensor electronics operable to receive one or more signals from at least one of the core assembly the actuator or the power electronics.

In an embodiment, a system comprises: a mechanically compliant touch display, at least a portion of which comprises ferritic material; a core assembly including a plurality of magnetic cores arranged in a two-dimensional plane, each core comprised of ferromagnetic material and wound by a coil of conductive wire, the coils operable for producing magnetic flux density in response to electrical currents flowing in the coils, wherein the current in each coil flows in a direction that is opposite the currents flowing in adjacent coils, wherein the coils are magnetically coupled to the portion of the mechanically compliant touch display by a magnetic circuit, for producing mechanical force in response to the effect of magnetic flux on the portion, the portion of the mechanically compliant touch display being mounted for deflective movement towards the core assembly; power electronics operable to supply currents or voltages to the coils; sensor circuitry operable to receive one or more signals from at least one of the core assembly the actuator or the power electronics; and a processor coupled to the power electronics and sensor electronics, the processor operable to control one or more electrical characteristics of the coils.

Particular embodiments disclosed herein provide one or more of the following advantages. The disclosed multi-core, multi-dimensional electromagnet design provides improved utilization of material volume to delay saturation and improved utilization of coil turns to maximize the strength of the electromagnet. The multi-dimensional aspect of the multi-core design uses the core area more efficiently than conventional single dimension, multi-core electromagnets.

The details of the disclosed embodiments are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Figure 1:
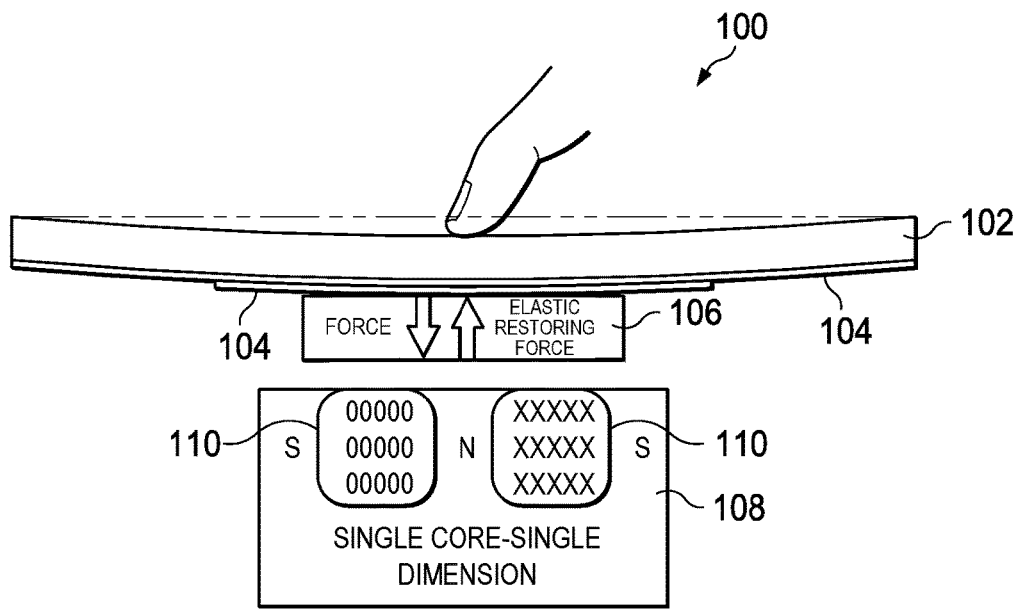
FIG. 1 illustrates a haptic feedback application that uses an electromagnetic reluctance actuator, according to an embodiment.

FIG. 1 illustrates a haptic feedback application that uses an electromagnetic reluctance actuator, according to an embodiment. In this example embodiment, a mechanically compliant touch screen 100 of an electronic device includes cover glass 102 and display stack-up 104. A ferromagnetic attraction plate 106 is attached to display stack-up 104. Positioned under attraction plate 106 is magnetic core 108 and coil 110. The magnetic attraction of attachment plate 106 towards core 108 due to reluctance force $F_{rel}$ (a "pull" force) is caused by alignment of the magnetic field generated by current flowing through coil 110. The direction of current flow in coil 110 is indicated by the commonly used symbols "x" and "o". The magnetic flux density is concentrated in the direction of core 108 using a flux concentrator, alternating pole, a Halbach array or the like.

Haptic feedback is provided by the on/off action of coil 110. When a user touches the cover glass 102 in a manner that triggers a haptic event a drive circuit forces current through the coil, applying a force to the cover glass described in Equation [1]. Upon the coil being disabled, the cover glass returns to its equilibrium state due to the elastic restoring force of the mechanically compliant touch screen 100. The deformation or displacement of the cover glass may be varied with respect to time to achieve the desired haptic feedback, e.g., single pulse, continuous vibration, or an arbitrary waveform. In many haptic applications it is desirable to adjust the reluctance force $F_{rel}$ to ensure that haptic feedback deforms the cover glass with the desired amplitude 100. For small form factor devices such as smart phones, there are electrical power and volume constraints.

Magnetic flux density saturation of the ferromagnetic core limits the reluctance force that can be generated per unit volume of core. Due to magnetic field saturation the single core, single dimension design shown in FIG. 1 is not desirable. One solution to the saturation problem is to use a larger core. If the height of coil (z-axis) is constrained, however, then the core must be extended in the x-y plane. This extension in the x-y plane increases the electrical resistance in the coil wire due to the longer length, which causes more power to be dissipated in the form of heat in coil 110. Therefore, a large, single core design is not a power efficient design and may not be suitable for battery-powered devices with power constraints.

One solution to the resistance problem is to use multiple cores arranged in a single dimension with fewer layers of wires per core. Multiple cores with a reduced number of layers of wires per core dissipates less power than the single core, single dimension design for the same reluctance force due to the shorter length of the wires because they are closer on average to the central axis of the core.

Figure 2:
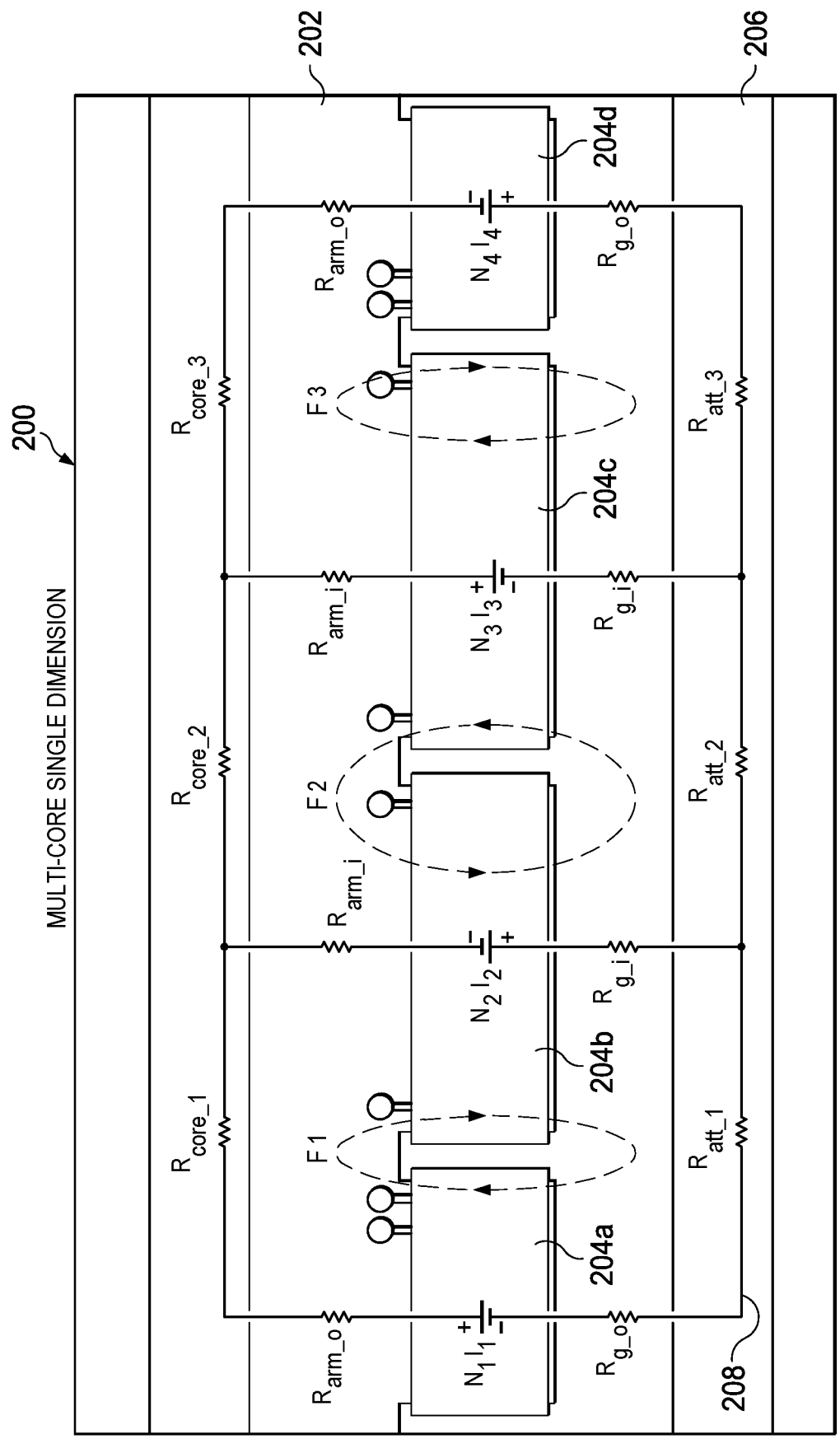
FIG. 2 is a side view of a multi-core, single dimension electromagnetic reluctance actuator, according to an embodiment.

FIG. 2 is a side view of a multi-core, single dimension electromagnet reluctance actuator 200, according to an embodiment. Actuator 200 includes core assembly 202 having four cores 204a-204d and attractive plate 206. The multi-core design shown in FIG. 2 can increase the reluctance force $F_{rel}$ on attraction plate 206 further by delaying the saturation limit of the core area. The delay occurs because the multi-core design distributes the saturation region over a larger volume of the ferritic material, allowing for a higher pull force at a narrow air gap. In addition to better utilization of material volume to delay saturation, the multi-core design allows better utilization of copper wires to maximize ampere-turns. Ampere-turns is the parameter that governs the strength of the electromagnet.

The spatially distributed magnetic field in actuator 200 can be described using MEC 208, which exploits the analogy of magnetic and electric fields. MEC 208 can be set up using lumped parameters. The total volume subjected to the magnetic flux Φ is separated into flux paths. Each flux path is modeled at circuit level by magnetic reluctances for the core assembly/armature ($R_{arm}$), air gap ($R_g$) and attractive plate ($R_{att}$). The product of N·I is commonly referred to as the magneto motive force (MMF). For purposes of applying electrical circuit laws to a magnetic circuit, the MMFs $N_1 \cdot I_1$, $N_2 \cdot I_2$ and $N_3 \cdot I_3$ are modeled at circuit level as voltage sources, where N is the number of ampere-turns exciting the magnetic circuit and I is the current in the coil. Through application of Kirchhoff's voltage law (KVL) and Kirchhoff's current law (KCL) a system of equations can be determined, which allows calculation of magnetic fluxes and flux-dependent parameters such as the reluctance force $F_{rel}$. For an n-core electromagnet, Equation [2] gives the reluctance force:

$$F_{rel} = \sum_{1}^{n} \frac{\Phi_n^2}{2\mu_o A_n}. \quad [2]$$

It is noted that MEC 208 assumes the flux paths follow mean paths, negligible fringe fields, no leakage flux and tight wire packing without staggering. The system of equations can be written as N·I=RΦ as shown in Equation [3]:

$$\begin{bmatrix} N_1 + N_1 \\ N_2 + N_2 \\ N_3 + N_2 \end{bmatrix} [I] = \begin{bmatrix} k_1 + k_5 & k_2 & 0 \\ k_2 & 2k_2 + k_3 & k_2 \\ 0 & k_2 & k_4 + k_5 \end{bmatrix} \begin{bmatrix} \Phi_1 \\ \Phi_2 \\ \Phi_3 \end{bmatrix}, \quad [3]$$

where:

$k_1 = R_{att\_1} + R_{arm\_0} + R_{core\_1} + R_{arm\_i}$, $k_2 = R_{arm\_i} R_{g\_i}$, $k_3 = R_{att\_2} + R_{core\_2}$, $k_4 = R_{att\_3} + R_{arm\_0} + R_{core\_3} + R_{arm\_i}$ $k_5 = R_{g\_0} + R_{g\_i}$.

The reluctance matrix R is a tridiagonal matrix which can easily extended as more cores are added to the core assembly.

There are a few key takeaways for actuator 200. First, for limited volume force is a square function of current. Second, increasing turns to volume also increases force but may run into power constraints. Third, increasing the number of cores divides the magnetic flux lines through the same core area, leading to a more efficient design in terms of higher force per unit power and higher force per unit volume.

As previous stated, a problem with the single dimension, multi-core design is that outer cores 204a, 204d of the core assembly 202 tend to saturate first making outer cores 204a, 204d less effective at maintaining magnetic flux lines. To mitigate the saturation delay problem, the outer cores 204a, 204d can be made smaller than the inner cores 204b, 204c, as shown in FIG. 2. This design often results in oblong circular cores and/or long rectangular cores, which provide less force per unit volume. As can be observed in Equation [1], in power and volume constrained systems it is highly desirable to maximize the available volume to maximize the reluctance force $F_{rel}$.

Figure 3:
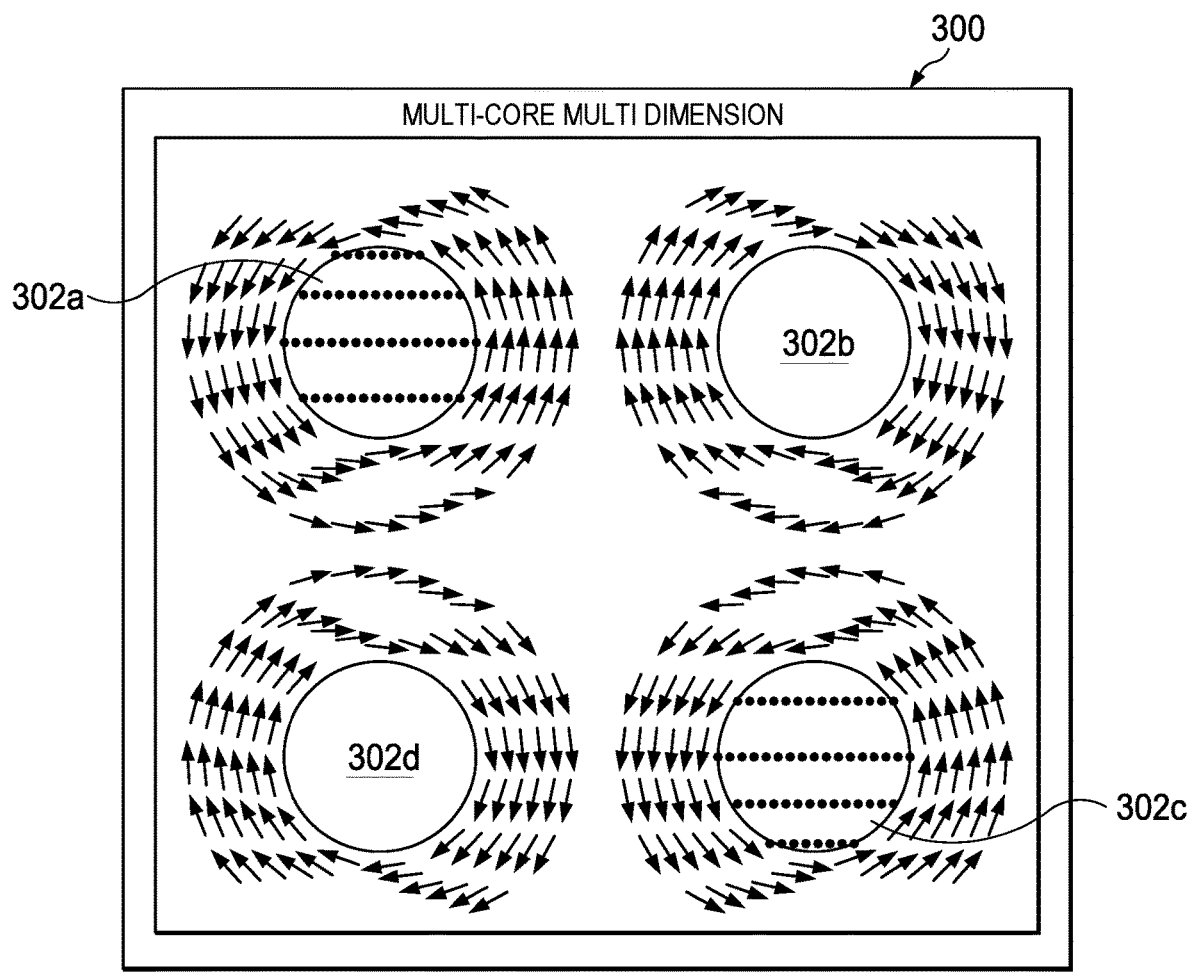
FIG. 3 is a top view of a multi-core, multi-dimension core assembly, according to an embodiment.

FIG. 3 is a top view of a multi-core, multi-dimension core assembly 300, according to an embodiment. Core assembly 300 improves upon the single dimension, multi-core design, by extending the cores in a two-dimensional (2D) plane. Extending the cores in a 2D plane results in a higher reluctance force per unit volume because it eliminates the oblong circular or rectangular cores used in the single dimension, multi-core design.

In the example shown, core assembly 300 includes cores 302a-302d arranged in a symmetrical grid pattern. The arrows encircling cores 302a-302d represent the direction of currents flowing through the turns of the coils, which is either clockwise or counterclockwise around the cores 302a-302d. Magnetic flux lines emanate from the cores 302a-302d either out of the page or into the page depending on the direction of current flow in the coil. In FIG. 3, horizontal lines of dots shown on cores 302a, 302d represent magnetic flux lines emanating from cores 302a, 302d (out of the page) according to the "right-hand" rule. The magnetic flux lines emanating from a given core forms local loops with magnetic flux lines emanating from adjacent cores. Note that each core has a different direction of current flow in the coil then its two adjacent cores. That is the current direction alternates: counterclockwise for core 302a, clockwise for core 302b, counterclockwise for core 302c and clockwise for core 302d. Although electromagnet 300 is a 4-core grid pattern, any multi-dimension arrangement can be arranged in a core assembly using any desired number of cores. Each core can have any desired shape, dimensions or wire layers subject to volume and power constraints.

Figure 4:
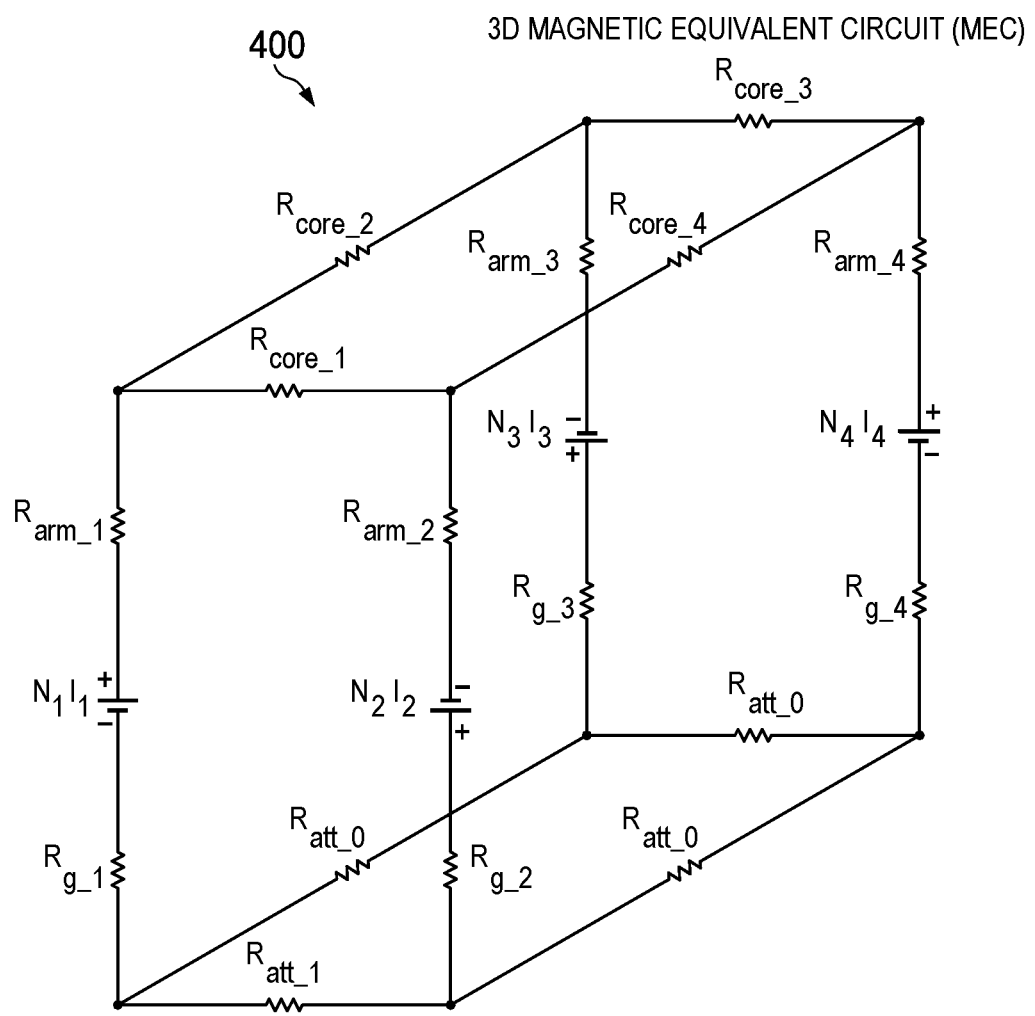
FIG. 4 is a three-dimensional (3D) magnetic equivalent circuit (MEC) for the multi-core, multi-dimension core assembly shown in FIG. 3, according to an embodiment.

FIG. 4 shows a three-dimensional (3D) MEC 400 for the multi-dimension, multi-core assembly 300 shown in FIG. 3, according to an embodiment. Note that MEC 400 is set up by "wrapping" the equivalent circuit of MEC 208 around the 4 cores in two dimensions. Equation [3] can be readily extended to the equivalent circuit of MEC 400 allowing the design to model the circuit in a similar manner as MEC 208.

Figure 5:
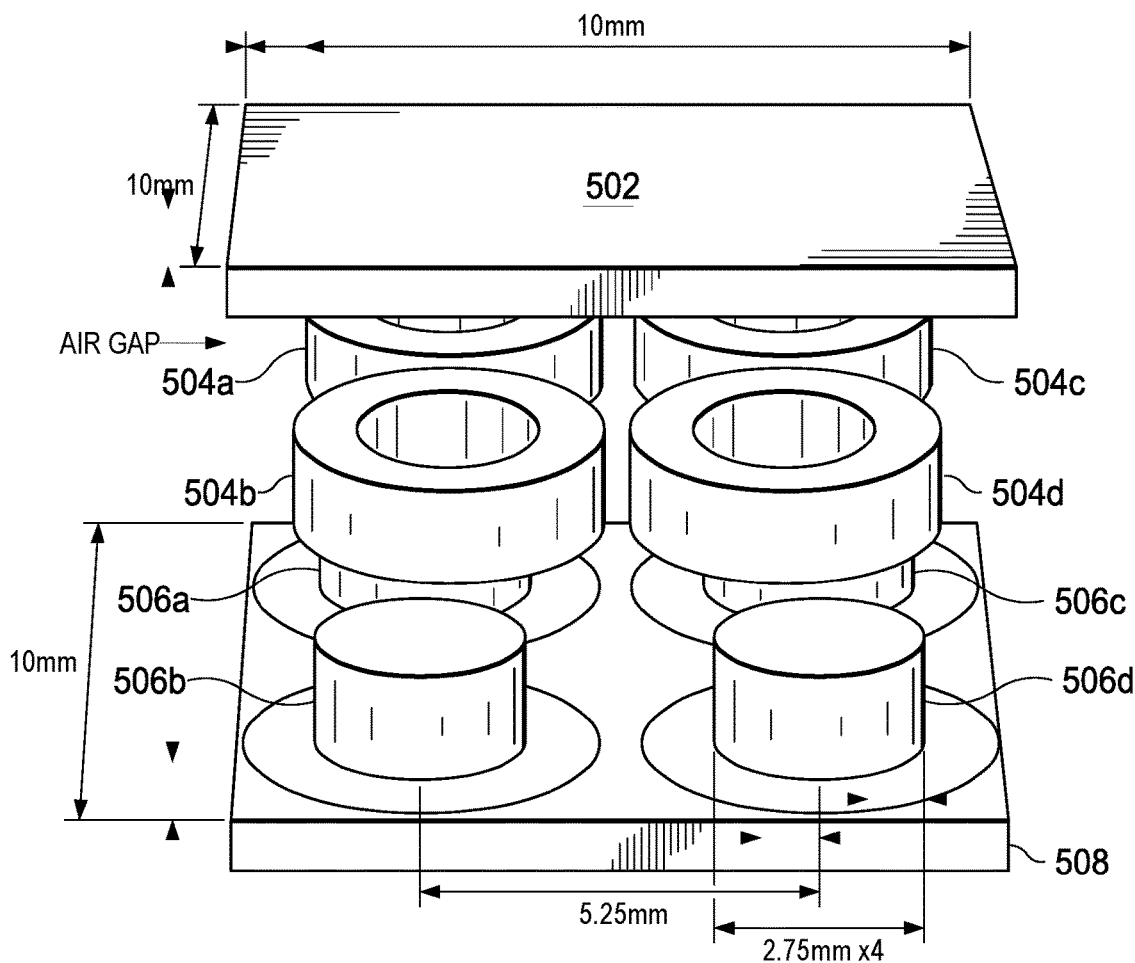
FIG. 5 is a perspective view of a multi-core, multi-dimension electromagnetic reluctance actuator, according to an embodiment.

FIG. 5 is a perspective view of the multi-core, multi-dimension electromagnetic reluctance actuator 300 shown in FIG. 3, according to an embodiment. Actuator 500 includes top plate 502, coils 504a-504d, cores 506a-506d and bottom plate 508. Some example critical model parameters for the design shown in FIG. 5 are included in TABLE I. Using these example critical model parameters, a simulation was run using, which produced the results shown in TABLE II. As expected, the multi-dimension, multi-core design improved the strength of the reluctance force while also improving the force per unit volume efficiency under power constraints.

TABLE I

Example Critical Model Parameters

| Parameter | Value | Unit | Description |
|---|---|---|---|
| Cores | 4 | | Total # of cores |
| Layers Z | 15 | | Layers of Wire in Z |
| Layers XY | 10 | | Layers in XY |
| Turns Per Core | 150 | | Total # of turns per core |
| Wire Diameter | 0.1 | μm | Wire diameter(inc. insulation) |
| Coil Current | 1.0 | A | Coil input current |
| d | 5.25 | mm | Core pitch |
| r | 1.375 | mm | Core radius |
| g | 0.5 | mm | Gap between coils |
| Coil CS height | 1.5 | mm | Cross-sectional coil height |
| Top Plate Height | 0.7 | mm | Height of the top plate |
| Bottom Plate Height | 0.7 | mm | Height of bottom plate |
| EM to Plate Gap | 0.250 | mm | Gap between EM and plate |
| Total Z (EM + Plate + Gap) | 3.15 | mm | Total space required |

TABLE II

Example Simulation Results

| Parameter | Value | Unit | Description |
|---|---|---|---|
| Force | 5.82 | N | Pulling force on top plate |
| Coil R | 3.75 | Ω | Resistance of each coil |
| Voltage | 3.75 | V | Voltage across each coil |
| Power | 15 | W | Power consumption on all coils |
| B_max | 1.2 | T | Max magnetic flux density |
| Coil Inductance | 0.76 | mH | Inductance of each coil |
| Delay constant | 0.203 | ms | L/R delay constant of each coil |

Figure 6:
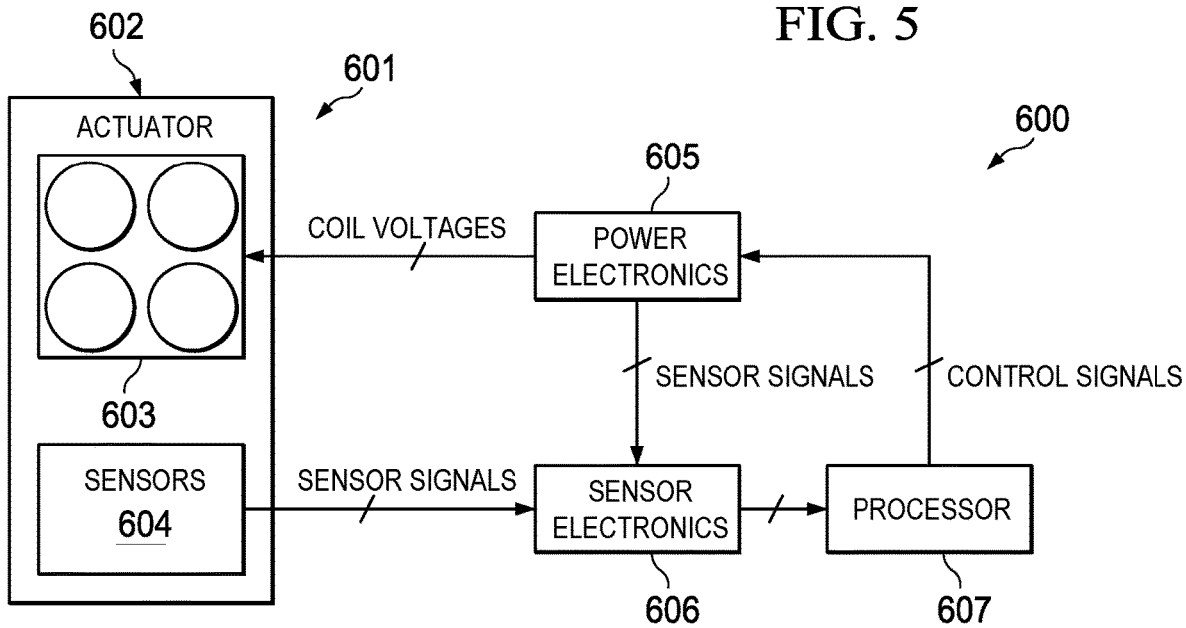
FIG. 6 is a block diagram of an electromagnetic reluctance actuator system that uses a multi-core, multi-dimension electromagnet, according to an embodiment.

FIG. 6 is a block diagram of an actuator system 600 that uses a multi-dimension, multi-core assembly, according to an embodiment. System 600 can be included in any electronic device that uses an electromagnetic reluctance actuator, including but not limited to a smartphone, notebook computer, tablet computer, wearable computer or any device or system that includes a haptic feedback.

In the example embodiment shown, system 600 includes electromagnetic reluctance actuator 601, which includes housing 602 containing multi-dimension, multi-core assembly 603 and one or more sensors 604. Actuator 601 is coupled to power electronics 605, which provides coil voltages to coils in core assembly 603. Sensor electronics 605 is coupled to actuator 601 and power electronics 605 and receives sensor signals from these components. Processor 607 provides control signals to power electronics 605 and receives sensor signals from sensor electronics 606.

Power electronics 605 can have integrated current sensors and measure the current in each coil in core assembly 603 individually with, for example, a hall-effect based sensor. The armature state of actuator 601 can be monitored using sensors 604 that measure position, acceleration and temperature, or any other desired parameter. Sensor electronics 606 can include various components for conditioning the sensor signals, including but not limited to one or more filters (e.g., low pass filtering) and at least one analog-to-digital converter (ADC). Processor 607 can be central processing unit (CPU) of an electronic device in which the actuator 601 is integrated (e.g., a smart phone), and execute software instructions that implement a closed feedback control algorithm for actuator 601. In an embodiment, processor 607 can include at least one Pulse Width Modulator (PWM) for generating PWM control signals to activate and deactivate coils in core assembly 603 based on sensor signals.

A number of embodiments have been described. Nevertheless, it will be understood that various modifications may be made. Elements of one or more embodiments may be combined, deleted, modified, or supplemented to form further embodiments. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. An electromagnetic reluctance actuator comprising:
   a core assembly including a plurality of magnetic cores arranged in a grid pattern in a two-dimensional plane, each core comprised of ferromagnetic material and wound by a coil of conductive wire, the coils operable for producing magnetic flux in response to electrical currents flowing in the coils, wherein the current in each coil flows in a direction that is opposite the currents flowing in adjacent coils, wherein the plurality of magnetic cores includes four or more cores arranged in a symmetrical grid pattern in the two-dimensional plane; and
   an actuator, a portion of which comprises ferritic material magnetically coupled to the coils by a magnetic circuit, the actuator configured for producing mechanical force in response to an effect of the magnetic flux on the portion of ferritic material, the portion of ferritic material being mounted for movement relative to the core assembly.

2. The electromagnetic reluctance actuator of claim 1, wherein the actuator is coupled to a mechanically compliant structure.

3. The electromagnetic reluctance actuator of claim 2, wherein the mechanical force is an attractive or pull force that causes the mechanically compliant structure to deflect towards the core assembly, and wherein the mechanically compliant structure provides an elastic restoring force.

4. The electromagnetic reluctance actuator of claim 2, wherein the mechanically compliant structure is a touch screen of an electronic device.

5. The electromagnetic reluctance actuator of claim 4, wherein the portion of ferritic material is an attractive plate coupled to a display stack-up of the touch screen.

6. A system comprising:
   a mechanically compliant touch screen;
   a core assembly including a plurality of magnetic cores arranged in a grid pattern in a two-dimensional plane, each core comprised of ferromagnetic material and wound by a coil of conductive wire, the coils operable for producing magnetic flux in response to electrical currents flowing in the coils, wherein the current in each coil flows in a direction that is opposite the currents flowing in adjacent coils; and
   an actuator coupled to the mechanically compliant touch screen, at least a portion of which comprises ferritic material magnetically coupled to the coils by a magnetic circuit, the actuator configured for producing a mechanical force on the touch screen in response to an effect of the magnetic flux on the portion of ferritic material, the portion of ferritic material being mounted for movement relative to the core assembly.

7. The system of claim 6, wherein the mechanical force is an attractive or pull force that causes the mechanically compliant touch screen to deflect towards the core assembly, and wherein the mechanically compliant touch screen provides an elastic restoring force.

8. The system of claim 6, wherein the cores are cylindrical ferrite cores.

9. The system of claim 6, wherein the plurality of magnetic cores includes four or more cores arranged in a symmetrical grid pattern in the two-dimensional plane.

10. The electromagnetic reluctance actuator of claim 1, wherein the cores are cylindrical ferrite cores.

* * * * *